(12) United States Patent
Baker et al.

(10) Patent No.: US 7,616,090 B2
(45) Date of Patent: Nov. 10, 2009

(54) ELECTRONIC SECURITY SYSTEM

(75) Inventors: Donald D. Baker, McCordsville, IN (US); Paul Hoggard, Indianpolis, IN (US); William Dye, Indianapolis, IN (US)

(73) Assignee: Von Duprin, Inc., Indianapolis, IN (US)

( * ) Notice: Subject to any disclaimer, the term of this patent is extended or adjusted under 35 U.S.C. 154(b) by 383 days.

(21) Appl. No.: 10/850,276

(22) Filed: May 20, 2004

(65) Prior Publication Data

US 2005/0258933 A1    Nov. 24, 2005

(51) Int. Cl.
*G05B 19/00* (2006.01)

(52) U.S. Cl. .................. 340/5.22; 340/5.7; 340/310.11; 340/538

(58) Field of Classification Search ............... 340/5.22, 340/5.7, 825.72, 310.11, 538
See application file for complete search history.

(56) References Cited

U.S. PATENT DOCUMENTS

| | | | |
|---|---|---|---|
| 3,978,468 A | 8/1976 | Bond et al. | |
| 4,367,455 A | 1/1983 | Fried | |
| 4,563,625 A | 1/1986 | Kombrekke et al. | |
| 4,744,021 A | 5/1988 | Kristy | |
| 4,845,490 A | 7/1989 | Ward et al. | |
| 4,847,595 A | 7/1989 | Okamoto | |
| 4,912,461 A | 3/1990 | Cenzano, Jr. et al. | |
| 5,070,442 A | 12/1991 | Syron-Townson et al. | |
| 5,175,677 A * | 12/1992 | Kushiro et al. | 700/22 |
| 5,491,471 A * | 2/1996 | Stobbe | 340/5.61 |
| 5,650,955 A | 7/1997 | Puar et al. | |
| 5,703,806 A | 12/1997 | Puar et al. | |
| 5,777,545 A | 7/1998 | Patel et al. | |
| 5,808,587 A * | 9/1998 | Shima | 343/895 |
| 5,838,226 A * | 11/1998 | Houggy et al. | 340/310.11 |
| 6,041,010 A | 3/2000 | Puar et al. | |
| 6,822,555 B2 * | 11/2004 | Mansfield et al. | 340/538.11 |
| 7,091,830 B2 | 8/2006 | Anderson et al. | |
| 2003/0052770 A1 | 3/2003 | Mansfield, Jr. et al. | |

FOREIGN PATENT DOCUMENTS

| | | |
|---|---|---|
| EP | 206 483 | 12/1986 |
| WO | WO 01/37438 | 5/2001 |

\* cited by examiner

*Primary Examiner*—Edwin C Holloway, III
(74) *Attorney, Agent, or Firm*—Michael Best & Friedrich LLP

(57) ABSTRACT

An electronic security system. The system includes a plurality of electronic security devices. Each of these devices includes an input/output module that receives and decodes electronic signals and governs the functionality of the electronic security device. The system also includes a power supply module. The power supply module sends electrical power and modulated commands to the plurality of electronic security devices over power lines.

20 Claims, 5 Drawing Sheets

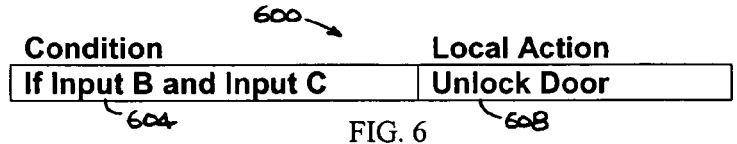
FIG. 5
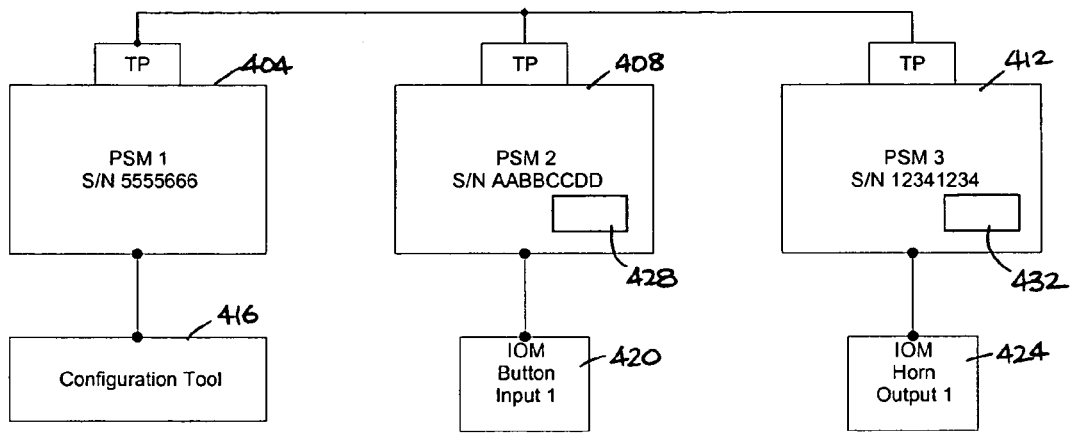
FIG. 6
FIG. 4
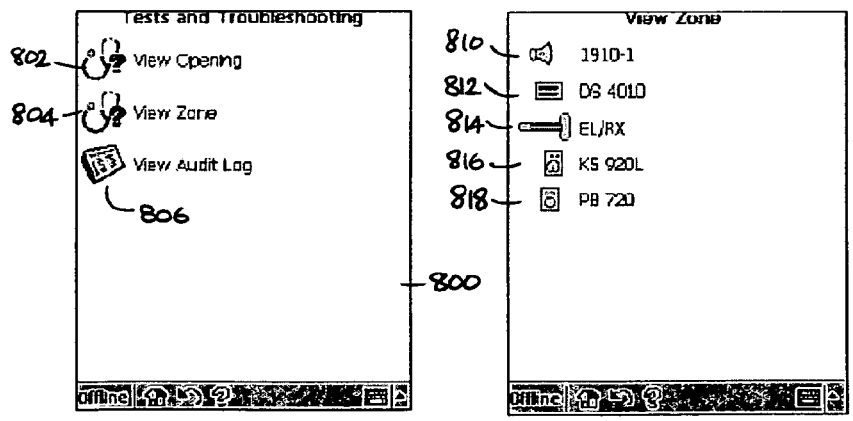
FIG. 8  FIG. 8A

ELECTRONIC SECURITY SYSTEM

BACKGROUND AND SUMMARY OF THE INVENTION

The present invention relates to electronic security systems and particularly to security systems that use electronic locks and other security devices to secure a building.

Conventional electronic security systems utilize electronic door locks, alarm horns, access control readers, sensing devices, etc., to secure a building. Typical electronic security systems combine one or more of these security devices at various doorways throughout a building. In conventional systems, these security products are wired in a unique way to achieve the particular security and safety solution desired. Because conventional systems must be wired according to the particular functionality desired, a significant amount of experience in configuring such systems is needed. After the hardware for performing the desired functionality has been selected, an electrical expert must design the circuit required to ensure the system functions properly. Such circuits often generate complex wiring diagrams and riser diagrams. Therefore, not only is the initial setup of the system complex, but also if the system is changed, the circuitry must be understood and reworked by another electrical expert. The hardware components that operate in such systems are often complex and require a hardware expert to determine the particular products that meet the desired functionality.

Common functions of typical electronic security systems include sounding alarms on forced entry, limiting access to those who possess the appropriate credentials, and sounding alarms if doors are held open too long or do not close properly. Other common electronic security system functions include limiting the number of doors that can be opened at a given time (interlocks), and applying timing values to particular operations to hold occupants in a building for a selected time or lock or unlock doors from a remote location. The conventional electronic architectural products that perform these functions can have many wires or connection points. Understanding these components and how they are to be wired to perform the desired functionality adds to the complexity of conventional systems. As mentioned, complex issues arise again if it is ever desired to reconfigure the system.

Lastly, even with the electrical expertise required to understand such conventional systems, there is no single particular solution for wiring the security system to meet a particular need. Therefore, an expert who is to service an existing electronic security system, which he or she did not set up, must first expend a significant amount of time and energy understanding the system.

Electronic security systems are becoming more and more prevalent on buildings. It can be time consuming and expensive to retain experts able to design and install conventional electronic security systems. An electronic security system that is easily installable and configurable without requiring electronic expertise would be welcomed by users of such security systems.

According to the present invention, an electronic security system includes a plurality of security devices electrically linked to a power supply over a series of power lines. Each device is coupled to the power lines with two wires. The devices and power supply also utilize the power lines to send and receive communication signals.

In preferred embodiments, each security device includes an input/output module ("I/O module"), which controls the device. The power supply includes a power supply module ("PSM") which receives the master functionality program for the system. Once the PSM is programmed with the desired functionality for the system, it sends signals over the power lines to the I/O modules of the various security devices, programming them according to the desired functionality. A bus, through which the power lines to each device run, controls the communication signals between the devices. The devices of the electronic security system can be configured in a star pattern, wherein each device is tied into a central connection point, in a daisy chain arrangement, wherein the devices are strung together, or a combination of both arrangements.

Additional features and advantages of the invention will become apparent to those skilled in the art upon consideration of the following detailed description of preferred embodiments and exemplifying the best mode of carrying out the invention as presently perceived.

BRIEF DESCRIPTION OF THE DRAWINGS

The detailed description particularly refers to the accompanying figures in which:

FIG. 4 shows an exemplary network according to the present invention, including multiple power supply modules linked together;

FIG. 5 illustrates a remote request packet sent within the network of FIG. 4;

FIG. 6 illustrates an exemplary door lock Boolean logic used in the system of FIG. 1;

FIG. 8 shows an exemplary user interface showing a tests and troubleshooting screen as would appear on a screen of the handheld device of FIG. 4; and FIG. 8A shows a zone view screen listing a plurality of devices available in the system as would appear on the handheld device of FIG. 4.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION OF THE PREFERRED EMBODIMENT

Figure 1:
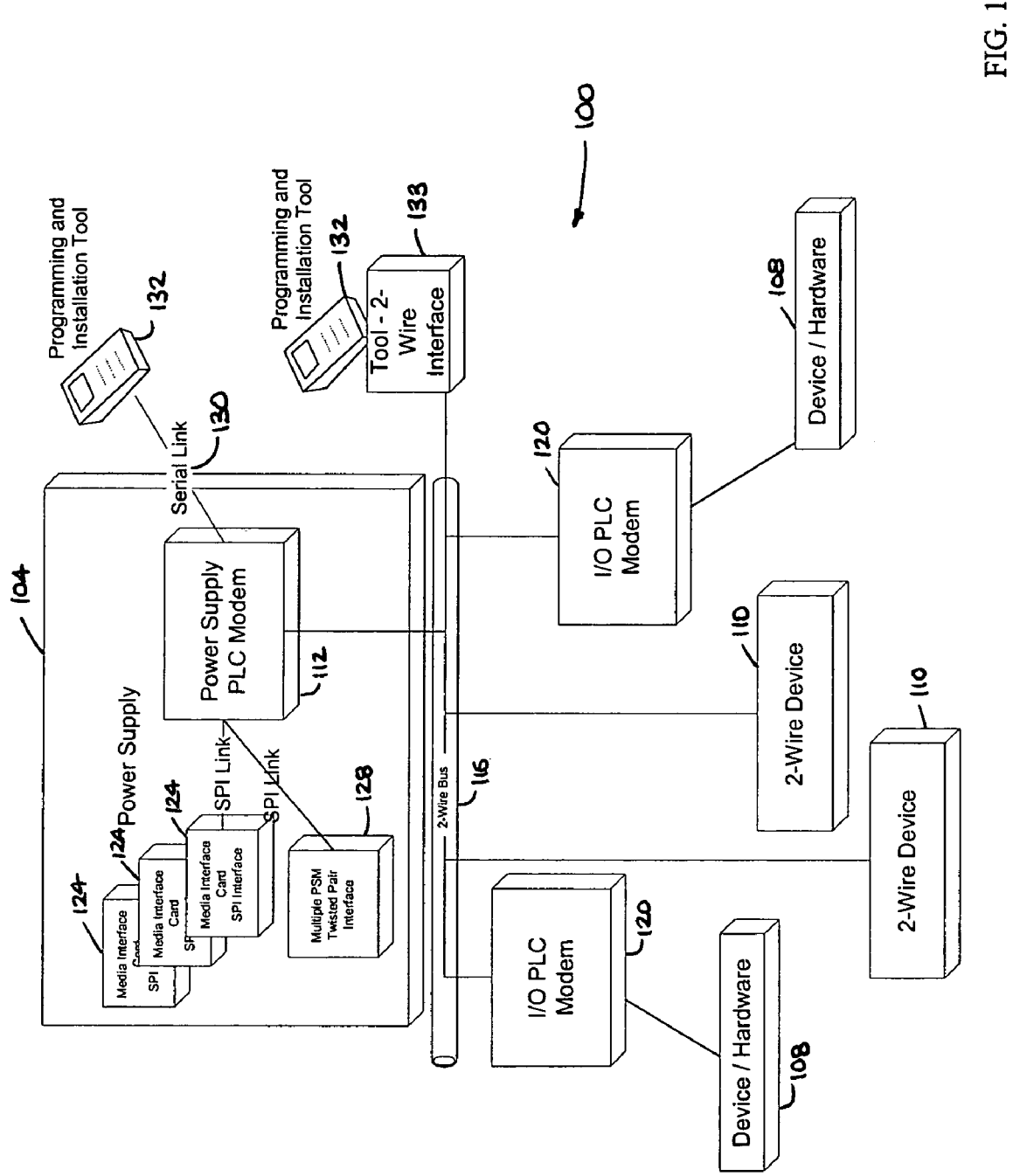
FIG. 1 shows a block diagram view of an electronic security system according to the present invention.

FIG. 1 shows a block diagram view of an exemplary 2-wire electronic security system or system 100 according to the present invention. The exemplary 2-wire electronic security system 100 includes a 2-wire power supply ("PS") 104 coupled to a plurality of input output modules ("IOMs") 120 via a 2-wire bus 116. A programming tool, or a configuration tool 132 in the form of a computer, a personal pocket computer, or a handheld computer can be also coupled to the PS 104 either directly via a serial link 130, or indirectly through a 2-wire interface 133 and the bus 116. The IOMs 120 are further coupled to a plurality of architectural devices or electronic security devices 108. Examples of security devices 108 include sensors, horns, shear locks, magnetic locks, electric strikes, actuators, buttons, motion sensors, door positioning switches, electric locks, exit devices, desk consoles, monitor strikes, magnetic switch, key switches, keypads, card readers, and the like.

In the embodiment shown, devices 108 are existing non-2-wire devices. As a result, external IOMs 120 provide linkages between the devices 108 and the bus 116, thus allowing exchange of data between the PS 104 and the devices 108.

Figure 3:
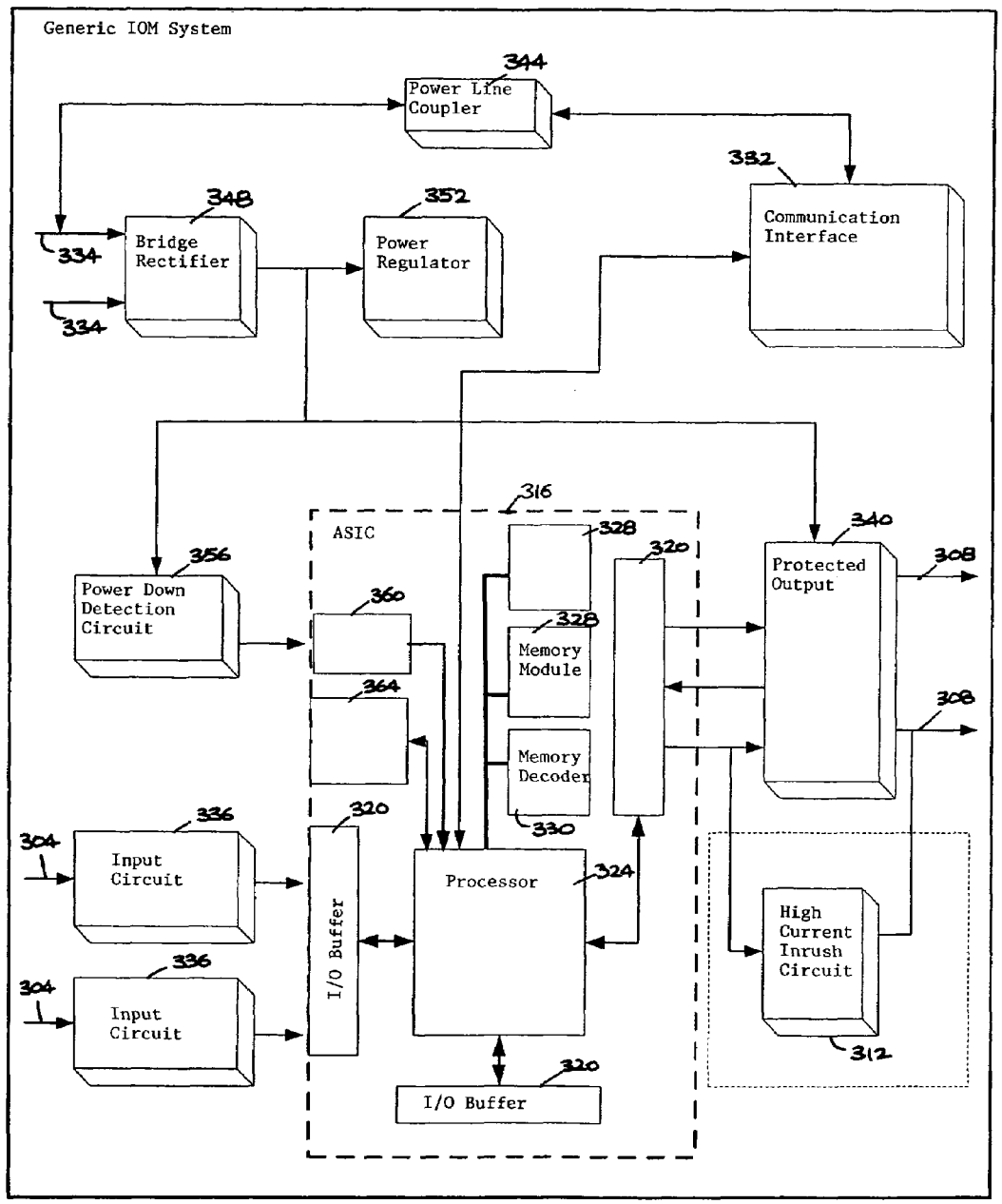
FIG. 3 shows a block diagram view of an input/output module of the electronic security system of FIG. 1.

Devices 110 are shown as 2-wire devices that are couplable to the bus 116 directly. That is, devices 110 are generally manufactured specifically for use in a 2-wire system such as system 100. These devices 110 generally have an internal IOM 120 such as shown in FIG. 3.

Figure 2:
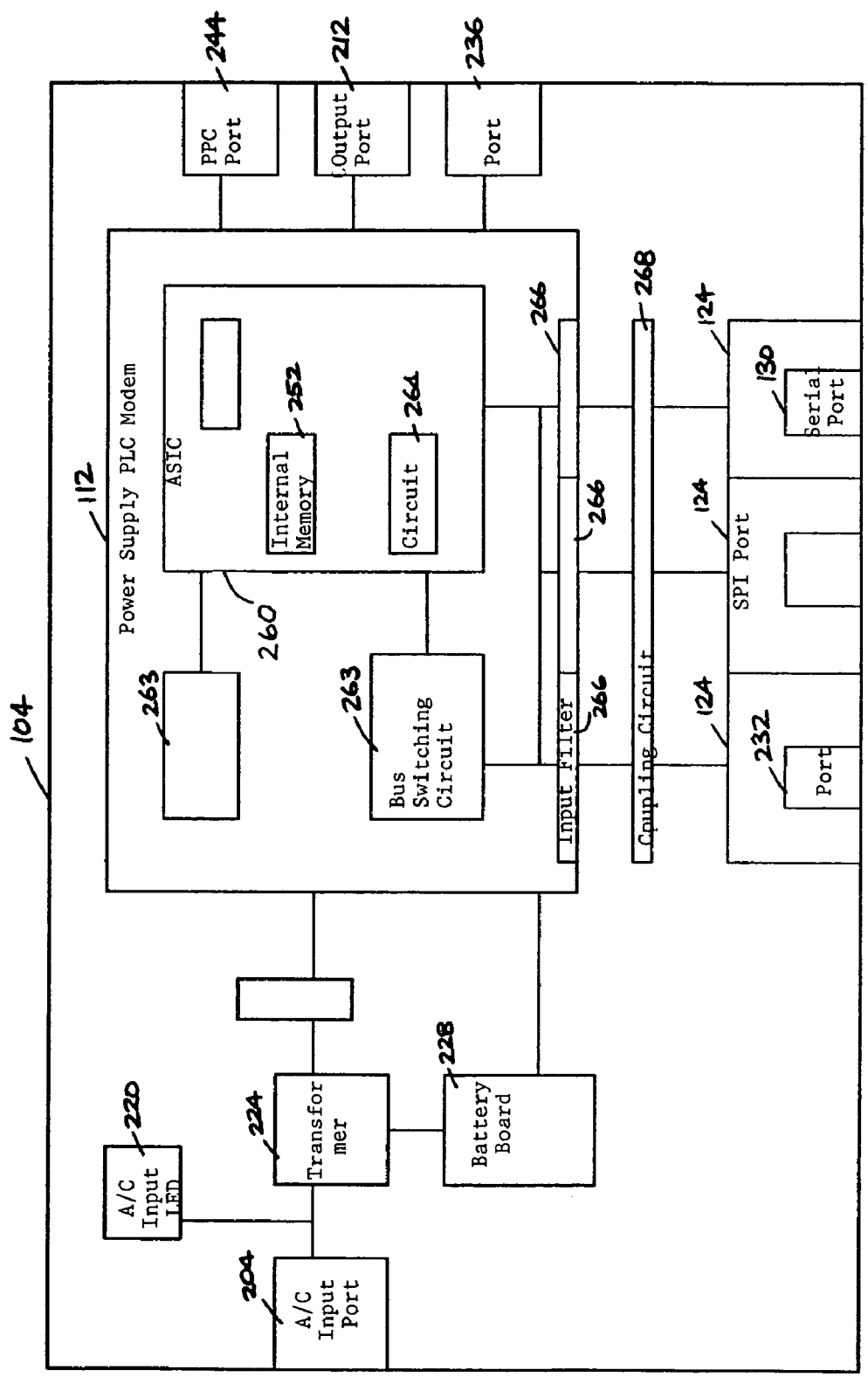
FIG. 2 shows a detailed block diagram of a 2-wire power supply of the electronic security system of FIG. 1 including a power supply module.

As shown in FIG. 1, the PS 104 also includes a power supply module ("PSM") 112 configured to manage the operation of the system 100. As best shown in FIG. 2, the PS 104 includes a power supply PLC modem or a power supply module ("PSM") 112 that manages and communicates with the IOMs 120 via the 2-wire bus 116. In addition to carrying configuration signals or instructions, the 2-wire bus 116 also carries power from the PS 104 to the IOMs 120 in the system 100.

The PSM 112 is also equipped with a timing circuit that can be used as a time reference by the rest of the system 100, and an application-specific integrated circuit ("ASIC") 260 that includes a power failure detection circuit 264. Specifically, the power failure detection circuit 264 senses or monitors an incoming supply voltage level. If the incoming supply voltage level falls below a predetermined value, the ASIC 260 will generate a warning signal indicating an impending power failure.

Furthermore, the ASIC 260 also accesses an internal memory 252 or an external memory 262 for a configuration that governs the system 100. The ASIC 260 first decodes the configuration from the memory 252 or 262, processes and modulates the power with the configuration using schemes such as frequency shift keying modulation. The ASIC 260 then amplifies and buffers the configuration modulated signal to prepare for outputting to the 2-wire bus 116. The ASIC 260 then transmits the signal to the IOMs 120 via the 2-wire bus 116. However, other sequences of transmission are also possible.

The PSM 112 also includes a 2-wire bus switching circuit 263 that is controlled by the ASIC 260. Specifically, the ASIC 260 controls the power present on the bus 116 via the 2-wire bus switching circuit 263. For example, on power-up or when the ASIC 260 is reset, the 2-wire bus switching circuit 263 is turned off by the ASIC 260, such that the relay is open. As a result, there is no power provided to the 2-wire bus 116 by the PS 104. The 2-wire bus switching circuit 263 will be turned on when the ASIC 260 outputs the power in conjunction with the signal.

Referring back to FIG. 1 and FIG. 2, the system 100 also allows other external processors and other peripherals to be coupled to the PSM 112 for special purposes, such as additional processing power and special input output ("I/O") combinations. For example, the PS 104 has a plurality of serial peripheral interface ("SPI") ports 124. Each port 124 is separately selected by a select signal from the ASIC 260. Furthermore, the PS 104 is also configured to be able to provide the external peripherals with different current voltage signals, and different data transfer rates.

One of the SPI ports 124 includes a PSM-to-PSM communication interface port 232 that is configured to allow communications between a plurality of PSMs 104, or PSM-to-PSM communications via a twisted pair wiring network. For instance, the ASIC 260 of one system can be coupled to the ASIC 260 of another system via the PSM-to-PSM communication port 232 of the SPI ports 124 to allow relatively fast transfer of information between the PSMs 112. The PSM-to-PSM communication interface port 232 also provides the necessary power amplification to drive any low-impedance load that can appear on the PSM-to-PSM communication interface port bus.

The ASIC 260 can be programmed either via a serial TTL RS-232 port 130 of the PS 104, or can be programmed in the manufacturing process. Once a program has been programmed in the ASIC 260, it may be upgraded via the 2-wire bus 116 or the serial port 130. The programming of the PSM 112, and in particular, the ASIC 260 is detailed hereinafter.

A plurality of input filters 266 are coupled to the ASIC 260 and the SPI interface ports 124 including the PSM-to-PSM communication interface port 236. The input filters 266 increase a signal-to-noise ratio at the inputs of the ASIC 260 by filtering out anything outside a predetermined frequency range, for example, between 110 kHz to 130 kHz. The input filters 266 are generally Chebyshev type passive filters of the 4th order, with less than 1 dB ripple at its output and about 6 dB attenuation. However, filters such as the Butterworth filters that satisfy the filtering characteristics can also be used. Furthermore, a coupling circuit 268 bridges between the interface ports 124, 232 and the ASIC 260 to allow non-polarization of the SPI interface ports 124.

Furthermore, devices 108, 110 are generally configured by the PSM 112 (detailed hereinafter), or by the programming tool 132. For example, other PSMs, or programming tools can access the PSM 112 via the SPIs 124. Once access is permitted, system configuration stored in the PSM 112 and other system diagnostic operations can be updated and performed.

Referring to FIG. 1, the system 100 also allows for adding devices 108 or 110 into the system 100 without the need for any programming tools. Specifically, the PSM 112 automatically detects the presence of a new device (for example, device 110), and configures the new device. As also shown in FIG. 2, the power supply 104 incorporating the PSM 112 provides functions such as detecting the presence of new devices and configuring the new device according to a particular functionality desired by the user.

The PS 104, as shown in FIG. 2, includes an alternating current ("AC") input port 204, and a plurality of main output ports configured to communicate with various devices (e.g., devices 108 and 110 in FIG. 1) and other power supplies (as discussed below with reference to FIG. 4). For example, the PS 104 provides a 2-wire output port 212 through which the PSM 112 is coupled to the bus 116 (FIG. 1). More specifically, the 2-wire output port 212 includes exactly two terminals. Each terminal is coupled to an input terminal of the devices 108 via IOM 120, and 110. The remaining SPI communication port 124 is configured to couple the PS 104 to other networks, while a pocket personal computer ("ppc") port 244 is configured to couple the PS 104 to a handheld device such as a ppc. Specifically, the ppc port 244 provides a route other than the serial port 130 through which serial data or programming instructions can be entered. As briefly mentioned above, the PSM 112 also includes a memory area 252 that stores information regarding what devices 108, 110 and IOMs 120 are present in the system 100.

Once the PS 104 is powered through the AC input port 204, an AC input LED 220 is lit indicating the PS 104 is powered. A transformer 224 is coupled to the AC input port 204, and provides multiple outputs. Each of the transformer outputs provides a particular AC voltage. The AC voltages are thereafter further rectified to obtain a plurality of direct current ("DC") voltages, which are supplied to the rest of the power supply 104. A battery board 228 continuously monitors the AC power input while a chargeable battery thereon is being charged. The battery board 228 via the chargeable battery supplies power to the PSM 112 in the event the AC power input is interrupted.

The PSM 112 is also capable of data logging. Each PSM 112 has a segment of the memory 252 or 262 reserved for timed logging system data. Types of data to be logged include input changes, output changes, password changes, PSM resets, failures, etc. For example, when an input value is changed on a device 108, data such as a time of the day, the corresponding year, the device serial number, and the new input value are logged in the reserved memory. If a password is changed (i.e., a password for a particular device, the overall network password, etc.), data such as the time of the day when the password is changed, the corresponding year, and the password is stored in the memory 252 or 262. If the PSM 112 has been reset, in addition to the time of the day when the PSM 112 is reset, and the corresponding year, the reserved memory also stores a cause of the PSM reset. As will be readily apparent to those of ordinary skill in the art, other data may also be logged if desired.

Several types of IOM 120 are used in the system 100, for example, a standard IOM ("SIOM") and a high current IOM ("HIOM"). A generic IOM system block diagram 300 that describes installations such as SIOM and HIOM, is shown in FIG. 3. The generic IOM system 300 can either be a self-contained IOM configured to couple to a preexisting device 108, or internal to a device 110 specifically developed for the system 100. The IOM 120 has a plurality of input terminals 304 and output terminals 308. The inputs 304 are generally linked to security devices such as sensors, actuators, buttons, motion sensors, door positioning switches, or the like. For most low current devices, the standard module ("SIOM") will serve as the IOM and be configured to couple the device to the 2-wire bus 116. The high power module ("HIOM"), which supports a 16 Amp inrush current, will be used as the IOM to drive certain high current devices. Other types of IOM devices supported by the system 100 include high quantity IOM that provides a high number of inputs and outputs.

Furthermore, the IOM 120 receives its power and programming signals via the 2-wire bus 116 and 2-wire power lines or 2-wire input terminals 334.

Every IOM 120 in the system 100 has an internal timer. Upon powering up, each IOM 120 sends a time request command to the PSM 112. In response to the time request command, the PSM 112 sends out a time broadcast addressed to the IOM 120. In addition, the PSM 112 sends out a periodic time broadcast to all the IOMs 120 in the network to update the time being kept at the IOMs 120.

The IOM system block diagram 300 also includes a second ASIC 316 that indirectly communicates with the 2-wire bus 116 via an IOM power supply 352 and an interface 332. The interface 332 is configured to modulate the output signals of the second ASIC 316, and to receive signals and instruction from other components in the system 100. Further, the interface 332 also includes an output amplifier that provides power amplification to drive any low impedance loads that appear on the 2-wire bus 116. When it is not transmitting information, the amplifier is in low power mode. The amplifier further includes an input filter that increases the signal-to-noise ratio at the ASIC 316. The input filter filters out any signal that is outside a predefined frequency band. However, the filter does not attenuate the signal by more than a predefined amount in the desired bandwidth, and generally has a constant group delay. The amplifier also includes an output impedance control switch that isolates an output stage from the input filter when the amplifier is receiving. A bi-directional coupling circuit 344 bridges the interface 332 and the 2-wire bus 116.

The second ASIC 316 can be programmed in a variety of ways via the 2-wire bus 116 and a SPI port 232. Once the ASIC 316 recognizes that there is a programming signal, the ASIC 316 enters a programming mode, and awaits to receive data and instructions. When the programming signal is reset, the ASIC 316 terminates the data and instructions reception, and operates normally.

Referring back to FIGS. 1, 2, and 3, the PSM 112 is also configured to manage the topology of the system 100. For example, the PSM 112 has the attribute addresses to the devices, such as 108 and 110. A device list is located in the memory 252 or 262 of the PSM 112. For example, if a LOCK uses address 0xA0, the device list's 0xA0 entry will contain LOCK as a device type. The device list is very useful to rapidly discover every device on the system 100.

As a result, every input and output ("I/O") in the system 100 has a unique identifier that is specified by an instance or an address. When the PSM 112 assigns an address to the IOM 120, the PSM 112 also assigns a unique instance for each input 304 and output 308. The I/O instance list of the PSM 120 can be used to associate devices and instances. Specifically, there is an entry in these lists for the input and output instances. The first element of the list is instance 1 and the last entry is the maximum number of instances allowed or available. For example, if an IOM 120 with address 0xA0 has 2 inputs, instance 1 and instance 2, the first two entries on the I/O instance list will be 0xA0 and 0xA0. If an IOM 120 with instance 0xA1 is added, and if the PSM 112 assigns instances 3 and 4 to the IOM 120 with instance 0xA1, the first four entries on the I/O instance list will look be 0xA0, 0xA0, 0xA1, and 0xA1. In this way, the PSM 112 keeps in the memory 252 or 262 a list of all the inputs and outputs of the IOMs 120 of the system 100. As a result, the I/O instance list stored in the memory 252 or 262 can be used to associate devices and instances. That is, for each input or output of the system 100, there is a corresponding entry in the I/O instance list.

Referring back to FIG. 3, the application-specific integrated circuit ("ASIC") 316 of the IOM 120 directs the operations of the IOM 120. Specifically, the ASIC 316 includes a plurality of I/O buffers 320 configured to send and receive data to and from other parts of the IOM 120. Further, the ASIC 316 also includes a processor 324 that retrieves program instructions and data from a plurality of built-in memory modules 328. A memory decoder 330 of the IOM 120 then decodes the data and the instructions. Thereafter, the processor 324 modulates and processes the decoded instructions and data, executes the instructions according to an operating state of the system 100, and generates an output in response to a combination of the inputs and the operating state.

The IOM 120 communicates with the PSM 112 via a 2-wire bus communication interface 332. For example, the interface 332 provides functions including output signal amplification, output signal filtering, node input impedance control, input signal filtering. Specifically, the interface 332 is bi-directionally coupled to the ASIC 316, and a power line coupler 344. The power line coupler 344 is bi-directionally coupled to one of the 2-wire power lines 334 which is further coupled to the 2-wire bus 116. The coupler 344 demodulates or decodes the modulated signal from inputs 334, or modulates or encodes data from the interface 332 onto the power lines 334. In this way, the user just needs to couple the 2-wire power lines 334 onto the bus 116 when a new 2-wire device such as device 110 is to be added to the system 100. The PSM 112 coupled to the bus 116 will thereafter start adding it onto its instance list (details are explained hereinafter). The 2-wire power lines 334, in addition to receiving the programmable logic among other information from the PSM 112, also carry the power for operation of the IOM 120. However, the power polarity of the connected devices may be different each time the device 108 or 110 is plugged into the system 100. As a result, a power bridge rectifier 348 is configured to accommodate any polarity. The polarity-desensitized or polarity independent power from the rectifier 348 is provided to the parts of the IOM 120 including a protected output 340 and a power down detection circuit 356. The rectified power from the rectifier 348 is also regulated in a power supply regulator 352.

The IOM 120 also includes a plurality of input circuits 336. The inputs 304 are coupled to the input circuits 336, and the outputs of the input circuits 336 are fed to the I/O buffer 320 of the ASIC 316. The input circuits 336 are configured to sense the current voltage signal that is between 24 VDC and 0 VDC. While the circuit 336 provides an input voltage threshold, it also allows a maximum continuous input voltage that is higher than the input voltage threshold.

The IOM 120 further includes a plurality of protected discrete general-purpose outputs 308 protected by a protection circuit 340. The protection circuit 340 receives its input from the processor 324 via the buffer 320 of the ASIC 316, its rectified power from a rectifier 348, and outputs an operating instruction to its associated device 108 or 110 through the outputs 308. The protection circuit 340 is activated for each output at a predefined threshold. Specifically, a feedback circuit of the protection circuit 340 is configured to decrease the output current if excessive voltage or overcurrent is present at the outputs 308. The feedback circuit also sends a diagnostic signal to the ASIC 316 to signal whether any of the outputs 308 are shorted or opened. Furthermore, each output 308 is equipped with a thermal limit circuit, which senses a rise in a junction temperature associated with the overcurrent condition. If the overcurrent or short-circuit condition persists, the thermal limit circuit will turn off the corresponding faulty output 308. If a high power module is required, a high current inrush circuit 312 is added in series to the output 308 of the IOM 120.

Referring back to FIG. 1, the PSM 112 can be similarly configured in a variety of methods. For example, if the PSM 112 does not contain any configuration data and is programmed by a user-interface configuration offline, there are three different configuration paths. Specifically, if the PSM 112 does not contain configuration data, the PSM 112 checks to determine if the programming tool 132 has been connected to the system 100 via the 2-wire 116. If the programming tool 132 has been connected, the pre-canned or preprogrammed configuration data stored in the programming tool 132 will be transferred or uploaded to the PSM 112. The PSM 112 then determines if there is any missing IOM that is not part of another 2-wire system. If there is missing IOM, the PSM 112 will leave the existing IOMs 120 in a pre-canned pending state, and the programming tool 132, if still attached, displays that there are missing devices. The configuration process is reset and starts again. However, if all the IOMs 120 are present, the PSM 112 checks to see if there is any device duplication. If there is no duplication, the PSM 112 proceeds to transfer the configuration data loaded earlier on the IOMs 120 of the system 100. The system 100 is then configured. On the other hand, if there is device duplication, a user can resolve the duplication listed in the PSM 112 using the programming tool 132 as long as the programming tool 132 is still attached. The resolved configuration is then transferred to the IOMs 120, and the system 100 is configured.

If the programming tool 132 has not been pre-programmed or contains no pre-canned information, the programming tool 132 can be used to program the system 100 online. The programming tool 132 will direct a user to configure the PSM 112 and the system 100 using a user-interface wizard, which is detailed hereinafter. The configuration is thereafter transferred from the programming tool 132 to the PSM 112, and further into the IOMs 120. The system 100 is then configured.

If the PSM 112 contains some configuration data, the programming tool 132 then proceeds to determine if the data is generic by checking for specific IOM serial numbers. If the PSM 112 does not contain specific IOM serial number, the programming tool 132 checks to determine if all the IOMs are present. If there is any IOM missing, the PSM 112 will leave the existing IOMs 120 in a pre-canned pending state, and the programming tool 132, if still attached, displays devices are missing. The configuration process is reset and starts again. If all the devices are present, the programming tool 132 then checks for device duplication. If there is no device duplication, the PSM 112 transfers the configuration data to the IOMs 120, and the system 100 is configured. However, if there is device duplication, the user can resolve the duplication listed in the PSM 112 using the programming tool 132 as long as the programming tool 132 is still attached. The resolved configuration is then transferred to the IOMs 120, and the system 100 is configured.

Further, if IOM serial numbers are known, the programming tool 132 again checks for missing IOM device. If there is missing device, the power is removed from the 2-wire bus 116. On the other hand, if all the devices are present, the PSM 112 then transfers the configuration data to the IOMs, and the system 100 is configured.

If a new PSM is to replace an existing PSM 112, the present invention allows for the PSM replacement without having to reprogram the system 100. First, if there is no pre-canned configuration set into the new PSM before its installation, the new PSM will check whether already-configured devices are found on the system 100. If configured devices are found on the system 100, the new PSM 112 will know that it has been added to an already-configured system 100 and will start uploading the IOM configuration. This mode is used when a PSM need to be replaced by another one. In this case, there is no need to reprogram the system.

Specifically, if the new PSM 112 determines that the existing IOM 120 has configured data, the configured IOM 120 transfers an IOM list to the new PSM 112. The new PSM 112 then compares the IOM list from the configured IOM 120 with the actual IOMs 120 present in the system 100. If it is determined that there is any IOM missing, the programming tool 132, if still attached, displays devices that are missing, and the new PSM 112 is reset. The PSM replacement process restarts again. If all the devices are present, the new PSM 112 obtains the configuration data or the pre-canned data from all the existing IOMs 120, and the system 100 is once again configured.

On a configured system 100, the PSM 112 can replace a non-responding IOM 120 by another one that has a same manufacturer model number. Upon initialization, the PSM 112 verifies that all the configured IOMs 120 are present. Otherwise it will look for a replacement IOM. If there is no replacement IOM, the corresponding address in the memory 252 is set to missing, then the system 100 falls into a failure mode.

A new or unconfigured IOM periodically sends a configuration request until the PSM 112 executes the configuration for that particular IOM 120. Once the configuration process is complete, the newly configured IOM 120 will be set to an unbound state. (An unbound IOM does not execute its programmable logic and does not share its I/O states to other devices in the system 100.) To set the unbound IOM back to a configured IOM, the configuration tool 132 is used. If the configuration request received is from an IOM 120 already listed in the PSM memory 252, the settings of the IOM 120 are automatically restored.

In addition to the I/O instance list and the device list, the PSM 112 also keeps a copy of the configuration states of the IOM 120 in the memory 252. In some cases, the state stored in the memory 252 may not match the state stored in the memory 328 of the IOM 120. For example, the instance is set to free when the PSM 112 has no correspondence with an IOM 120. The instance is set to missing as described earlier when a configured device is missing. If no replacement IOM is found, the device is in a failure mode. Particularly, the PSM 112 sets the instance to missing when an IOM 120 disappears during a pre-canned configuration process or when the PSM 112 is unable to recover a configured IOM 120 on which a failure has been detected. During the pre-canned state, the configuration tool 132 sets the instance to pre-canned, and the IOM 120 remains in the pre-canned until the pre-canned configuration is executed. Further, the instance is set to broken when an IOM 120 has a hardware failure. The broken state differs from the others because it is only a mask that is applied to the value of the state prior to the failure. For example, if the state prior to failure is configured and has a value of 0x30, and the broken mask is 80h, the resulting value after the failure will be B0h. The broken mask is erased upon a PSM initialization. The broken state is set when no heartbeat is received within 6 seconds or when the communication between the IOM 120 and the PSM 112 drops.

The PSM 112 also provides a way to remove an IOM 120 from a configured system 100 without causing failures. Before removing an IOM 120, the PSM 112 determines that the I/O instances of the IOM 120 are not used in any programmable logic and that the I/O instances are not externally mapped with other IOMs in the system 100. The PSM 112 then proceeds to unconfigure the IOM 120, thereby setting all the configured IOMs 120 into an offline state. To execute their programmable logic, the IOMs 120 are set back into the configured state. The IOM removal process is complete when the removed IOM instance is reset.

The present invention also allows for a multiple PSM system. In a multiple PSM system, a plurality of PSMs can be connected together in a star pattern or in a daisy chain arrangement using the TP interface 128 (of FIG. 1). Communication medium such as a twisted pair cable or the like can be used to couple the TP modules 128 of the PSMs 112, thereby allowing communication between devices in the multiple PSM system.

FIG. 4 shows an exemplary network of a multiple PSM system 400. The multiple PSM system 400 includes a first PSM 404, a second PSM 408, and a third PSM 412. The first PSM 404 has a serial number 5555666, and is coupled to a configuration tool 416. The second PSM 408 has a serial number AABBCCDD, and is coupled to a button-input IOM device 420 with a second PSM memory 428. The third PSM 412 has a serial number 12341234 and is coupled to a horn-output IOM device 424 with a third PSM memory 432. The multiple PSM system 400 allows mapping of an input device coupled to one PSM onto an output device coupled to another PSM. Therefore, for instance, the input instance of the button-input IOM device 420 can map its output instance onto the horn-output device 424 with the configuration tool 416. Once mapped using the tool 416, the button 420 can activate the horn 424.

It would be apparent to one of ordinary skill in the art that the multiple PSM system 400 may include other input output devices coupled to the PSMs 404, 408, and 412. Specifically, the user can use the configuration tool 416 coupled to the first PSM 404 to send out a remote mapping request 500 (as shown in FIG. 5) to perform the mapping of devices 420 and 424. As shown in FIG. 5, the remote mapping request 500 includes an address 01h stored in a destination address segment ("Dest. Addr.") 504 and a serial number AABBCCDDh stored in a serial number segment ("PSM S/N") 508. Upon reception of the request 500, the second PSM 408 will verify in its memory 428 if input instance 01 exists, and that the instance 01 has not already been mapped to the third PSM 412. The second PSM 408 then sends a mapping request command to the third PSM 412. Upon reception of the mapping request command, the third PSM 412 will try to find an available input instance in the memory 432. If an input instance is available in the memory 432, the third PSM 412 will transmit a result identifying the available input instance in the memory 432 to the second PSM 408. Upon reception of the availability, the second PSM 408 will send a remote request result back to the first PSM 404 to confirm the mapping has been completed. The user is now able to control the horn 424 with the button 420.

In general, the inputs and outputs of the system 100 including the PSM 112, the IOM 120, and the devices 108, 110 are defined by a programmable Boolean logic. The Boolean logic can be remotely configured using the configuration tool 132. The Boolean logic includes a set of function blocks, timers and logical operators. Outputs are managed according to the programmed logic and a plurality of I/O states in the system 100. However, if additional operations are preferred, the user has the option of programming the operations into the IOM 120 via the configuration tools. Furthermore, the programmable logic is primarily output driven. Each system output has an associated programmable logic. The programmable logic represents a combination of conditions, system inputs, and some function blocks. These conditions are described using the Backus-Naur Form (BNF). However, other semantic representations such as ALPHA, block structure language, FORMAC, IITRAN, LPL and PL/1 can also be used.

Input values of the programmable Boolean logic are usually associated with hardware status, a button, or a sensor, for example. However, it is also possible to include other input values in the programmable logic such as input instances or contents of the addressing associated with the inputs. For example, input instances can be used as logic indicators. In other words, input instances can also be used as part of the determining Boolean logic parameters.

Two types of action can generally be performed on the output of each device 108, 110: "set" and "clear." Each of the two actions corresponds to some function of the device. For example, when a set action is invoked, a particular lock may be locked. As another example, a particular lock may be unlocked when a clear action invoked. These actions are normally locally executed, meaning that the targeted outputs are built in the device 108, 110. Moreover, a "set" output energizes an output while a "clear" output de-energizes an output.

FIG. 6 shows an exemplary Boolean logic 600 involving two inputs and one output. In the example, it is desired that a door be unlocked when two buttons are pressed. In general, a door lock module IOM is responsible for the unlocking action. The door lock module receives at its input a Boolean logic representing the button devices. In order to react upon the button logic, the door lock module IOM executes the exemplary unlocking Boolean logic 600. The unlocking Boolean logic 600 includes a condition segment 604, and a local action segment 608. In this example, when the logic presenting the buttons are true, the door lock module IOM will perform a device specific action—i.e., unlocking the door. It would be apparent to one of ordinary skill in the art that some devices need more complex conditions to trigger actions. The conditions might be based on a combination of time, a plurality of input states, and outputs states. For example, a system may need to energize door A starting when both input B and input C are "ON" for more than 5 seconds. The condition in this example verifies the simultaneous existence of two inputs for a particular duration.

Figure 7C:
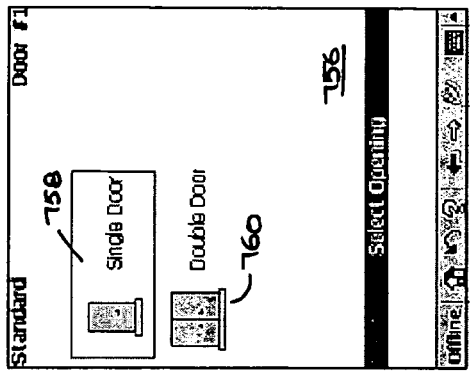
FIG. 7C shows an opening selection screen as would appear on the handheld device of FIG. 4.
Figure 7B:
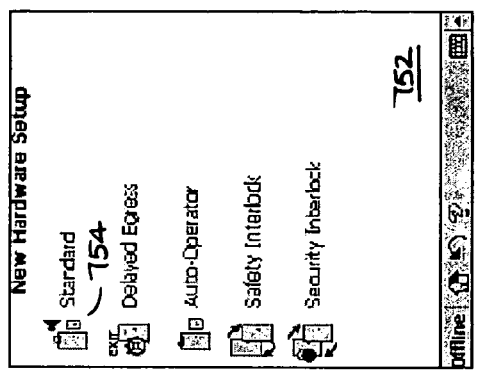
FIG. 7B shows a new hardware setup screen as would appear on the handheld device of FIG. 4.

The programming of the system 100 can generally be performed using a plurality of user interfaces such as a desktop computer, a laptop computer, a palmtop computer, a handheld device, a pocket computer or the like. An exemplary user interface 700 displaying a main menu 720 on the configuration tool 132 (of FIG. 1) is shown in FIG. 7. For example, if a user needs to set up a device in a system, the user can choose from a plurality of icons or options on a main menu 720 on the configuration tool 132. The icons or options include a hardware setup icon 724, a tests and troubleshooting icon 728, a system tasks and preferences icon 732, an advanced hardware setup icon 736, and a zone management icon 740. Each icon guides the user through a specific programming process. In the example, the hardware setup icon 724, once tabbed or selected, allows a user to create or edit a device setup with a guided process as detailed hereinafter. Other selection methods including entering a return key can also be used.

Figure 7A:
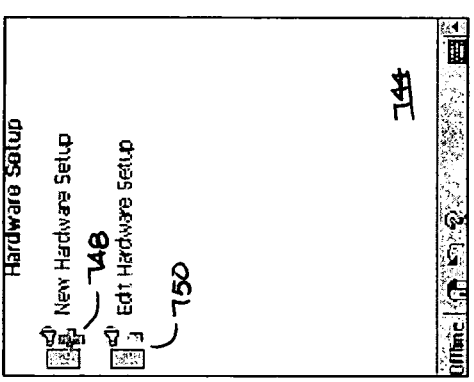
FIG. 7A shows a hardware setup screen as would appear on the handheld device of FIG. 4.
Figure 7:
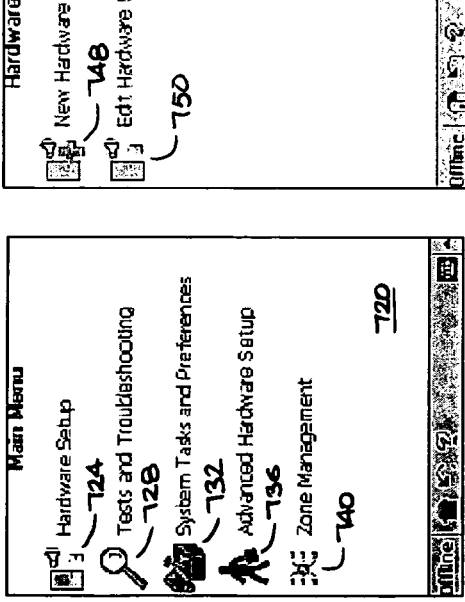
FIG. 7 shows an exemplary user interface showing a main menu as would appear on a screen of the handheld device of FIG. 4.
Figure 7F:
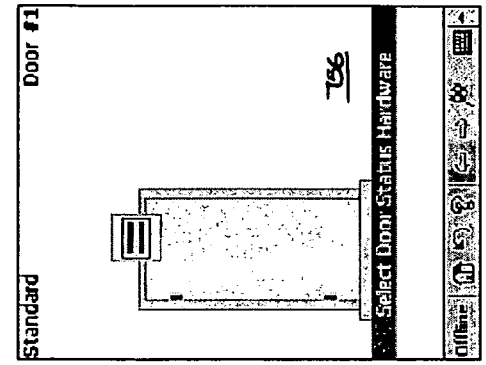
FIG. 7F shows a door status display selection screen as would appear on the handheld device of FIG. 4.
Figure 7E:
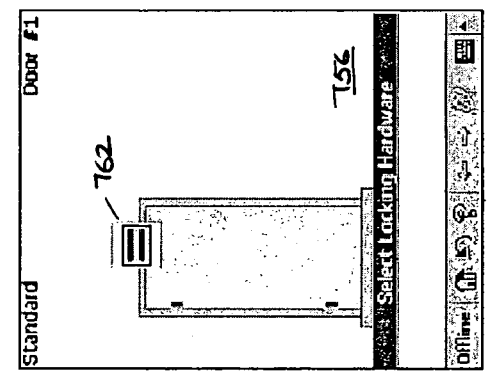
FIG. 7E shows a locking hardware selection screen as would appear on the handheld device of FIG. 4.
Figure 7D:
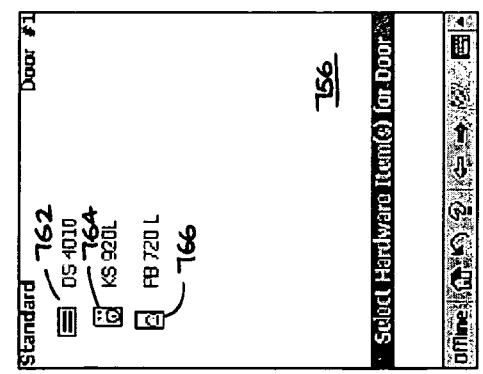
FIG. 7D shows a hardware item selection screen for door as would appear on the handheld device of FIG. 4.

After the guided process has entered a hardware setup display 744 as shown in FIG. 7A, the user will be presented with a new hardware setup option 748 and an edit hardware setup option 750. A new display 752 listing five sub-options including a standard option 754 (as shown in FIG. 7B) is shown, after the new hardware setup option 748 has been tabbed or selected. If the standard option 754 is tabbed or selected, a standard screen 756 listing a single door option 758 and a double door option 760 is displayed (shown in FIG. 7C). Once the single door option 758 has been selected, the configuration tool 132 then displays available hardware items on the system. As shown in FIG. 7D, three types of hardware devices are available. These include a magnetic lock 762 with model number DS 4010, a key switch 764 with model number KS 920L, and a button lock 766 with model number PB 720L. After the magnetic lock 762 has been selected as a locking hardware (shown in FIG. 7E), the configuration tool 132 then may provide options for the user to select unlocking modules. For example, the key switch 764 and the button lock 766 can be used as the unlocking modules. That is, the door will be unlocked when an authorized user activates these devices. After the locking hardware has been selected, the configuration tool 132 will also prompt for door status via a door status hardware screen as shown in FIG. 7F. The door status hardware monitors whether a door is in an open position or in a closed position, or whether a locking device is locked or unlocked. The user then has the options to select a hardware item with a visual indicator to display the status of the door, or to finish the standard hardware setup by tabbing or selecting a finish icon 768. It should be noted the visual indicator will be able to display whether the door is physically closed, open, locked, unlocked, or in any other state.

The main menu 720 also offers other options as described earlier. For example, the tests and troubleshooting option 728 allows the user to view and test the hardware devices associated with an opening, or to view and test the hardware devices associated with a zone or a network of devices, among other things. An exemplary display 800 of the tests and troubleshooting option 728 is shown in FIG. 8. The display 800 lists a total of three options, namely, a view opening option 802, a view zone option 804, and a view audit log option 806. More particularly, the view zone option 804 allows the user to view and test all the hardware devices available on the network or the zone. For example, as shown in FIG. 8A, the system may have a horn 810, a magnetic lock 812, an exit device 814, a key switch with lights 816 and a push button 818 available. The user is then allowed to test the inputs to and the output of these devices.

The main menu 720 also includes the system task and preferences option 732 that allows the user to change a network password, to delete a device, and to upgrade the network, among other things. The zone management option 740 allows the user to add a device to a system, to create a new system, and to rename the system, for example. The user is also to program the system via the configuration tool 132 to set off an alarm, for example, using the advanced hardware setup option 736.

Other bodies, such as an option body depicting secondary options in a device, a text body where text is displayed and entered, and a time synchronization body for synchronizing the PSM time with the devices in the system 100, are also available to the user.

Although the invention has been described in detail with reference to certain preferred embodiments, variations and modifications exist within the scope and spirit of the invention as described and defined in the following claims.

Various features and advantages of the invention are set forth in the following claims.

The invention claimed is:
1. An electronic security system comprising:
a power line having exactly two wires;
a power supply electrically connected to the power line and including a power supply module,
the power supply module configured to receive electrical power, to selectively receive operational instructions, to modulate the electrical power with the operational instructions, and to supply the modulated electrical power through the power line;

a plurality of electronic security devices electrically connected to the power line, and configured to be powered with the modulated electrical power from the power line, each including an input/output module configured to receive the modulated electrical power, to decode the modulated electrical power to retrieve the operational instructions, to program the electronic security device based on the retrieved operational instructions, and to operate the electrical security device with the modulate electrical power and the programmed operational instructions;

wherein the power supply module also includes a multiple power supply module interface configured to couple the power supply module to and to transmit programming signals to another power supply module of another electronic security system via a line.

2. The system of claim 1, further comprising a programming tool connectable to and disconnectable from the power supply module to communicate information from the programming tool to the power supply module.

3. The system of claim 2, wherein the programming tool is a hand-held device.

4. The system of claim 2, wherein the communicated information comprises at least one of a program and a command.

5. The system of claim 2, wherein the programming tool further comprises an access screen configured to access and control the electronic security devices.

6. The system of claim 1, further comprising a programming tool connectable to and disconnectable from the power lines to communicate information from the programming tool to the power supply module.

7. The system of claim 6, wherein the programming tool is a hand-held device.

8. The system of claim 6, wherein the communicated information comprises at least one of a program and a command.

9. The system of claim 6, wherein the programming tool further comprises an access screen configured to access and control the electronic security devices.

10. The system of claim 1, wherein the power supply includes a communication port allowing the power supply to be connected to an external peripheral device.

11. The system of claim 10, wherein the external peripheral device includes one of a computer, a printer, and a monitor.

12. The system of claim 1, further comprising a programming tool configured to communicate with the power supply module wirelessly.

13. A method of establishing an electronic security system comprising the steps of:

receiving the electrical power at a power supply;

modulating the electrical power with a plurality of operational instructions at a first power supply module of the power supply;

supplying the modulated electrical power from the power supply through a two-wire bus to first and second input/output modules connected to the two-wire bus, the first and second input/output modules associated with first and second electronic security devices, respectively;

retrieving the operational instructions from the modulated electrical power at the respective first and second input/output modules;

operating the respective first and second electronic security devices with the electrical power from the power supply module and based on the retrieved operational instructions;

connecting and communicating bi-directionally between a multiple power supply module interface of the first power supply module and a second power supply module of a second electronic security system; and mapping at least a portion of the operational instructions to a third electronic security device of the second electronic security system via the multiple power supply module interface.

14. The method of claim 13, further comprising uploading the operational instructions onto the power supply module from an electrically and mechanically connected computer at the bus.

15. The method of claim 14, wherein the computer is a hand-held computer.

16. The method of claim 15, wherein the hand-held computer comprises one of a personal digital assistant, a palm-top computer, and a pocket personal computer ("PC").

17. The method of claim 14, wherein uploading the operational instructions onto the power supply module ("PSM") comprises wirelessly communicating the operational instructions to the PSM.

18. The method of claim 13, further comprising controlling at least one of the first and the second security devices with a programming tool.

19. The system of claim 1, wherein each electronic security device includes a sensor, a horn, a shear lock, a magnetic lock, an electric strike, an actuator, a button, a motion sensor, a door positioning switch, an electric lock, an exit device, a desk console, a monitor strike, a magnetic switch, a key switches, a keypad, or a card reader.

20. The method of claim 13, further comprising programming the respective first and second electronic security devices based on the retrieved operational instructions.

* * * * *

UNITED STATES PATENT AND TRADEMARK OFFICE
CERTIFICATE OF CORRECTION

PATENT NO. : 7,616,090 B2
APPLICATION NO. : 10/850276
DATED : November 10, 2009
INVENTOR(S) : Baker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Nineteenth Day of October, 2010

David J. Kappos
*Director of the United States Patent and Trademark Office*